United States Patent [19]
Kamphues

[11] 4,360,100
[45] Nov. 23, 1982

[54] APPARATUS FOR SETTING FORMED ARTICLES

[75] Inventor: Hermann Kamphues, Ibbenbüren, Fed. Rep. of Germany

[73] Assignee: C. Keller GmbH und Co, KG, Ibbenbüren-Laggenbeck, Fed. Rep. of Germany

[21] Appl. No.: 178,811

[22] Filed: Aug. 18, 1980

[30] Foreign Application Priority Data

Feb. 1, 1980 [DE] Fed. Rep. of Germany ....... 3003644

[51] Int. Cl.³ .............................................. B65G 47/32
[52] U.S. Cl. .................. 198/458; 294/63 R; 414/60
[58] Field of Search ....................... 198/458, 459, 486; 414/60, 61; 294/63 R, 87 R

[56] References Cited

U.S. PATENT DOCUMENTS

| | | | |
|---|---|---|---|
| 1,290,015 | 12/1918 | Penfield | 294/63 R |
| 3,887,060 | 6/1975 | Kamphues | 198/458 X |
| 3,973,795 | 8/1976 | Goransson | 294/87 R |
| 4,182,442 | 1/1980 | Jones | 198/486 X |
| 4,273,489 | 6/1981 | Lingl, Jr. et al. | 414/60 |

*Primary Examiner*—Jeffrey V. Nase
*Attorney, Agent, or Firm*—Horst M. Kasper

[57] ABSTRACT

An apparatus for setting of formed articles is provided wherein a transport belt carries cross rows of closely located ceramic briquettes into the region of a provision for separating the briquettes. When the briquettes are separated the cross rows are moved to a readying belt where after feeding of additional cross rows a setting is formed which can be lifted by a gripping machine. The provision for separating the ceramic briquettes closely located in cross rows comprises a liftable bridge spanning across the transport belt. A gripper carriage movable back and forth across to the transport belt is disposed at the liftable bridge which comprises neighboring individual grippers for gripping the briquettes at their front side, for lifting them up from the transport belt and for moving them in the direction providing a gap between them. After the gaps have been drawn as predetermined, the briquettes are placed onto the transport belt.

18 Claims, 5 Drawing Figures

APPARATUS FOR SETTING FORMED ARTICLES

BACKGROUND OF THE INVENTION

1. Field of the Invention

The present invention relates to an apparatus and a method for setting formed articles such as ceramic briquettes provided in cross rows on a conveyor belt.

2. Brief Description of the Background of the Invention Including Prior Art

Kamphues in U.S. Pat. No. 3,887,060 discloses an apparatus wherein ceramic briquettes brought together in a setting formed by longitudinal and cross rows are lifted by strips from rolls and are transported in the direction of the longitudinal direction of the roll axes until the first cross row in the direction of motion encounters a resistance by which the last lifted up cross row is again slid off the strips onto the setting support. The other lifted up cross rows are moved on with lifted resistance till reaching the desired cross row distance from the strips. Then by the renewed action of a correspondingly adjusted resistance another cross row is again slid from the strips onto the setting support. Such stepwise sliding off of all cross rows from the support strips onto the setting support results in a setting with predetermined distances between the individual cross rows. The support strips thereby pass over a distance corresponding to the width of the full setting.

In another known apparatus disclosed in German Offenlegungsschrift No. DT-OS 2,758,648 for separating closely spaced ceramic briquettes there are provided narrow, horizontally disposed, separated bands located between driven rolls which engage within the gaps between the rolls and which can move up and down and which are movable from each other and against each other. In the separation process the separated bands lift up a longitudinal row of ceramic briquettes from the rolls and the bands move away from each other with the same speed. The bands are driven such as to transport the halves of the longitudinal rows against the direction of motion of the bands wherein the bands unwind under the ceramic briquettes resulting in the ceramic briquettes passing in a tipping way and placed at distances onto the rolls. The distances between the ceramic briquettes are drawn such that the drive of the bands is switched off after each transfer of a ceramic briquette and such that the ceramic briquettes remaining on the bands are moved on by those which are already located on rolls. The separated bands pass over a distance corresponding to half a setting. After the moving apart of the ceramic briquettes the bands are lowered and move back into the starting position.

In another embodiment the separated bands are disposed tilted against each other. In the moving apart process of the ceramic briquettes the bands lift the ceramic briquettes up starting from the outside in longitudinal rows, wherein the bands are driven such that the ceramic briquettes are moved away from the others toward the outside. In this process the bands have to be lifted and the lift motion is controlled such that it can be interrupted providing certain distances between the moved away ceramic briquettes of the longitudinal row.

It is disadvantageous in these conventional machines that the ceramic briquettes pass during the formation of the setting from a higher level plane (support strips or bands) in a tipping way onto a lower level plane (rolls). This tipping causes an inaccurate transfer of the ceramic briquettes, since the ceramic briquettes can be distorted hereby based on their more or less sizable adhesion at the higher level plane and the distances between the individual cross rows or ceramic briquettes, respectively become inaccurate. This danger is also especially present with the bands disposed at an angle, since the ceramic briquettes can be distorted based on the resiliency and sliding of the bands in the transfer from the rolls. For the same reason the distances cannot be maintained, since the lift motion cannot be determined accurately, and it therefor occurs that only one ceramic briquette is moved. This occurs in particular when settings or longitudinal rows are positioned for ceramic briquettes of small thickness. It can occur that the ceramic briquettes during the transport with the gripper for setting fall out of the same, since they are not held sufficiently tight by the grippers.

In the conventional machines the higher level plane (support strips or bands) during the gap formation, which receives the ceramic briquettes, has to cover a distance corresponding to the full width of a setting. Only then the support strip or band plane, respectively, can be lowered below the level of the plane formed by the rolls and then be returned to the starting position to begin the formation of a new setting or a spaced apart longitudinal row, respectively. This course of motion takes a lot of time and provides a negative factor for the efficiency.

In addition, the conventional machines have the disadvantage that upon transfer and receiving, respectively, of the ceramic briquettes onto or from the rolls, respectively, an edge of the transferred or received, respectively, ceramic briquette chafes along the following ceramic briquette possibly causing chipping of the ceramic briquette.

In the bands disposed at an angle the velocity of the bands has to be selected depending on the lift motion of the bands thus requiring a slow motion of the bands, since otherwise no spaced distances would be effected between the ceramic briquettes.

Therefor, a correspondingly long time span passes for the separation of the ceramic briquettes, which negatively affects the formation of the setting, especially since the lifting motion of the bands has to be interrupted while the spaces are drawn.

SUMMARY OF THE INVENTION

Purposes of the Invention

It is an object of the present invention to provide an apparatus and a method allowing to separate ceramic briquettes for forming a setting without excessive stresses on the ceramic briquettes and especially without chafing.

It is another object of the present invention to reduce the overall time required for forming a spaced setting of ceramic briquettes.

It is a further object of the present invention to provide an apparatus for accurately spacing formed articles in a setting.

These and other objects and advantages of the present invention will become evident from the description which follows.

Brief Description of the Invention

The present invention provides an apparatus for setting formed articles. A controllable means for transporting carries the formed articles in a first horizontal direction, a bridge is disposed over the controllable means for transporting, which bridge can be lifted up or lowered down, at least one carriage is mounted on the bridge and controlled movable in a horizontal direction having a substantial component orthogonal to said first horizontal direction and at least two individual grippers are disposed adjacent and form a row in a horizontal direction having a substantial component orthogonal to said first horizontal direction for gripping the formed articles from the controllable means for transporting. Preferably the grippers form a row in the moving direction of the carriage and the carriage is controlled movable in a horizontal direction substantially orthogonal to the first horizontal direction. The grippers can grip the formed articles from the front side relative to the motion of the controllable means for transporting. The controllable means for transporting can be a conveyor belt or can comprise two conveyor belts separately controllable which adjoin closely spaced near the bridge. The bridge can be lifted or lowered by hydraulic jacks. The grippers are attached to the carriage or carriages. In a preferred embodiment two substantially mirror symmetrical carriages are employed and the carriages can move symmetrically apart from each other and together to each other. The formed articles can be ceramic briquettes which are disposed in cross rows on the means for transporting. In the present invention ceramic briquettes includes ceramic briquettes in various stages of their production and such ceramic briquettes for which the present invention is useful can be made of any material. Similarly, the formed articles can be from a variety of materials, in different stages of production and can have a variety of forms with the limitation that they can be carried by a means for transporting and that they can be gripped by a gripper.

The present invention also provides a method for resetting formed articles. The formed articles are moved in a horizontal first direction by a horizontal transportation means supporting them, the motion in the first direction is interrupted while some of the formed articles are below a plurality of gripper means with the plurality of gripper means disposed for matching the positions of formed articles below the plurality of gripper means, the gripper means are lowered for gripping said formed articles below the plurality of gripper means, the plurality of gripper means lifts while holding said formed articles, at least one of the gripper means moves in a horizontal direction having a component orthogonal to the first direction and the formed article is released from the gripper means. Before the release of the formed article from the gripper means the motion of said gripper means is preferably interrupted and the releasing is preferably preceded by a lowering of the gripper means to reduce the gap between the formed article and the transportation means. Some of the gripper means can move jointly in the horizontal direction and the releasing of the formed article can be preceded by a lowering of some of the gripper means including said gripper means to reduce the gap between the formed article and the transportation means. Preferably at least two gripper means move in a horizontal direction having a component orthogonal to the first direction. The plurality of gripper means can form at least two groups moving relative to each other substantially in opposite directions with about equal but oppositely directed speeds. It is preferred when the formed articles form cross rows to the first direction and when the gripper means are aligned in a horizontal direction orthogonal to the first direction. The formed articles can be gripped from the front side relative to the motion in said first direction by the plurality of gripper means.

The invention accordingly consists in the features of construction, combination of elements and arrangement of parts which will be exemplified in the apparatus hereinafter described and of which the scope of application will be indicated in the appended claims.

BRIEF DESCRIPTION OF THE DRAWINGS

In the accompanying drawings in which are shown several of the various possible embodiments of the invention.

DETAILED DESCRIPTION OF THE PREFERRED EMBODIMENTS

In accordance with the present invention an apparatus is provided for forming a setting of ceramic briquettes, which allows the separation of the briquettes for forming a setting without excessive interference with the briquettes and in particular without chafing and in a minimum time and which simultaneously effects an accurate positioning of the briquettes.

A transport belt carries closely located ceramic briquettes in cross rows, which are carried into the region of an apparatus for separating the closely located ceramic briquettes under provision of predetermined spacings and a readying belt is disposed following, which receives the spaced apart ceramic briquettes. The apparatus for separation is provided with a bridge crossing over the transport belt carrying the ceramic briquettes located close to each other in cross rows. The bridge can move up and down and a gripper carriage is disposed on the bridge, which carriage can move back and forth in a direction cross to the carrying direction of the transport belt. Individual grippers are disposed next to each other and preferably in a line on the gripper carriage for gripping the ceramic briquettes at their front sides. Alternatively, two gripper carriages can be provided which move towards each other and away from each other.

The advantages provided by the present invention comprise that the ceramic briquettes are placed by the individual grippers during the formation of the setting vertically and without tipping motion or chafing at the edges onto the rolls resulting in an accurate maintaining of the spacings to be provided between the ceramic briquettes.

The apparatus of the present invention is further characterized by a high efficiency, since the gripper carriage or the individual gripper, respectively, are only moved during gap formation for such a distance which corresponds to the sum of the gaps to be provided between the ceramic briquettes. For example in case eleven gaps are to be provided with a size of 10 mm each, then the gripper carriage moves 110 mm. If the gripper carriage is provided in two parts, that is two gripper carriages are present, then each part carriage passes over a distance of 55 mm. The gripper carriage is returned immediately to the starting position with all individual grippers have released the ceramic briquettes.

The shorter path of motion of the gripper carriage during gap formation results in a shorter construction length which is a positive factor when investment costs are considered.

The apparatus and method of the present invention allow to separate all kinds of forms of briquettes, since the width of the individual gripper is constructed for the smallest thickness of any briquette considered. In a construction for a small thickness of the briquettes a single pair of tongues grips a briquette, whereas larger thickness briquettes are gripped by several individual grippers at the same time.

Figure 1:
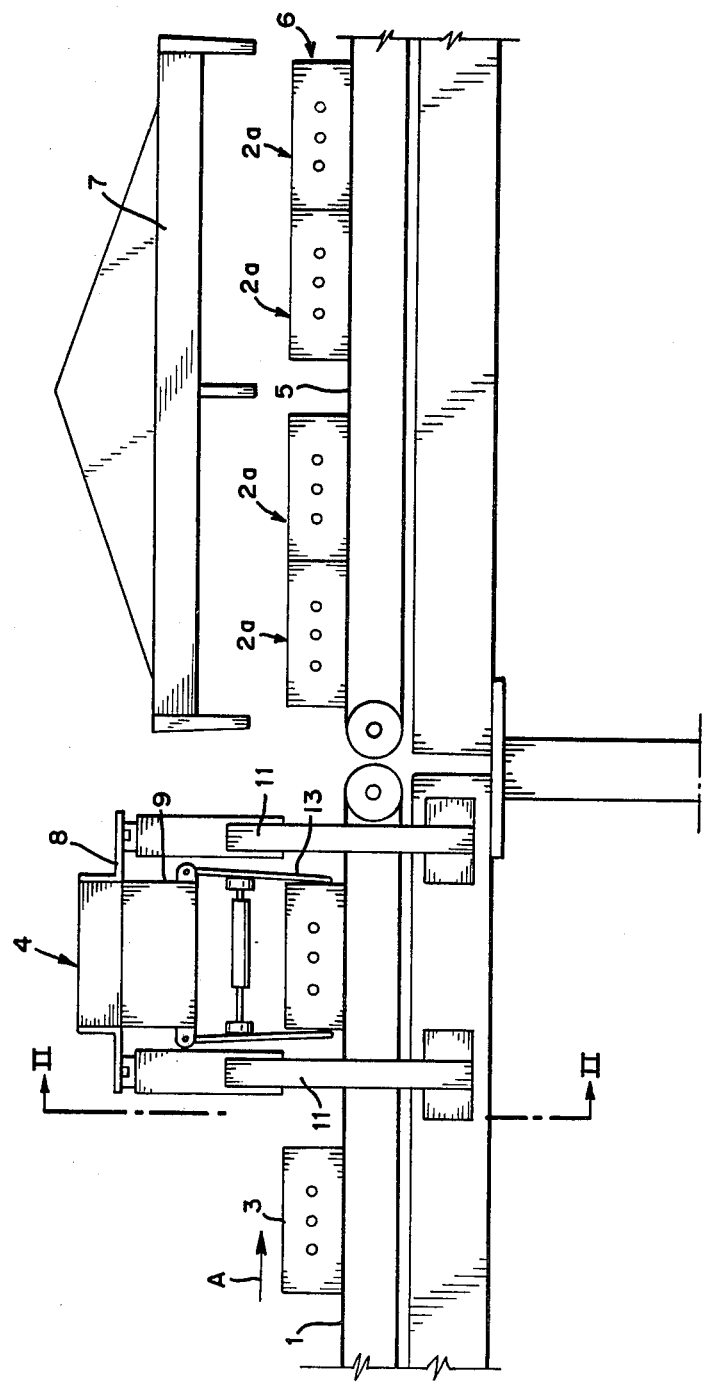
FIG. 1 is a side elevational view of the apparatus.
Figure 2:
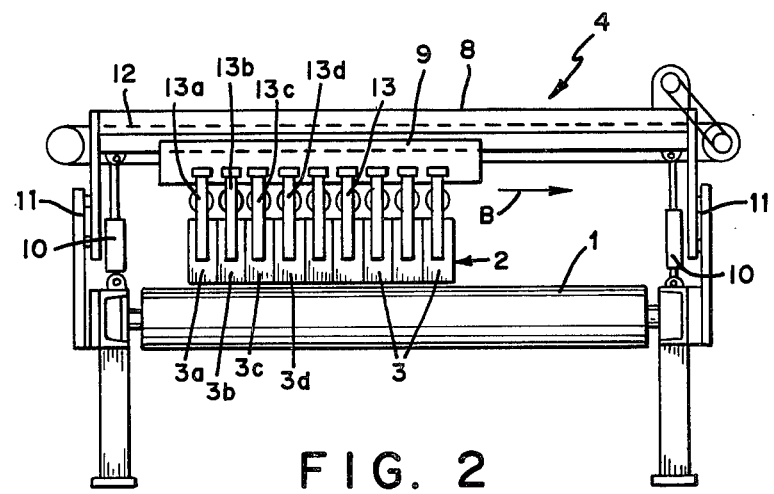
FIG. 2 is a view along section line II—II of FIG. 1.

Referring now to FIG. 1, there is provided a transport belt 1 carrying cross rows 2 of closely located ceramic briquettes 3 into the region of a separating apparatus 4, which spans over the transport belt across to the transport direction A as a bridge.

The separating apparatus 4 provides between the ceramic briquettes 3 of a cross row 2 the required distances or gaps, respectively. Then the cross rows 2a having gaps between their briquettes are transferred to a readying belt following, where by composition of several cross rows 2a a setting 6 is generated, which is then lifted up by a gripping machine.

The separating apparatus 4 comprises a liftable bridge 8 and a gripper carriage 9 disposed at the liftable bridge 8. The liftable bridge 8 can be moved up and down by jack units 10 with pistons and is guided by guideways 11. The gripper carriage 9 is constructed for moving back and forth by a chain pull 12 corresponding to the distances to be drawn. Individual grippers 13 are disposed at the gripper carriage 9 for gripping the front side of the ceramic briquettes 3. The gripper carriage can comprise two part carriages, or in other words two carriages are employed, which part carriages 9a and 9b move away from each other during the separating process and which move towards each other after the separating process is completed.

As soon as a cross row 2 has reached the region of the separating apparatus 4 the ceramic briquettes 3 in the cross row 2 are gripped at their front side by individual grippers 13. The liftable bridge 8 and therewith the gripper carriage 9 and the ceramic briquettes 3 are then lifted so far by means of the piston jack units 10 that the ceramic briquettes do not any longer touch the transport belt 1. Then the separation of the ceramic briquettes 3 is performed, which is done as follows:

By actuating the individual gripper 13a the ceramic briquette 3a is placed again on the transport belt 1. Then the gripper carriage 9 is moved in the direction of arrow B for drawing a gap between the ceramic briquette 3a placed on the transport belt 1 and the ceramic briquette 3b still located in an elevated position. If the desired gap is reached, then the individual gripper 13b is actuated placing the ceramic briquette 3b onto the transport belt 1. The gripper carriage 9 moves further in the direction of the arrow B and draws the desired distance between the ceramic briquette 3b and the ceramic briquette 3c. If this is reached, then the individual gripper 13c is actuated and the ceramic briquette 3c is placed on the transport belt 1. In the same way the desired distances or gaps, respectively, are drawn between all ceramic briquettes 3, wherein after the reaching of the distance in each case the corresponding individual gripper 13 is actuated.

Figure 3:
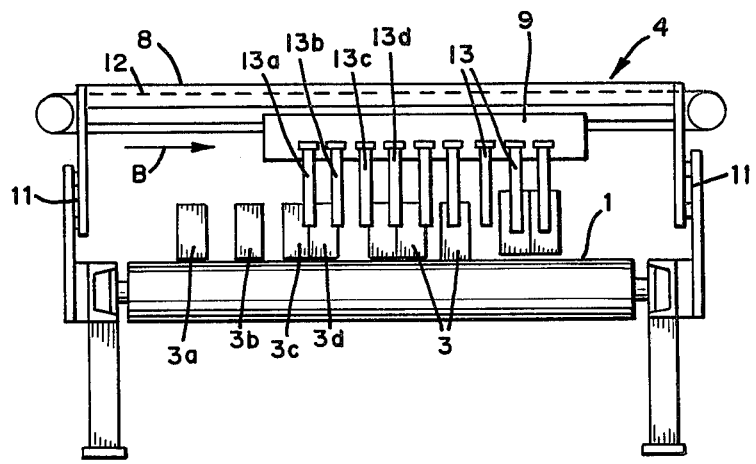
FIG. 3 is a view similar to that of FIG. 1, however in a different operating position.

It is also possible that after the drawing of a gap several individual grippers 13 are actuated at the same time, for example when the ceramic briquettes 3c and 3d are to be placed onto the transport belt without a gap therebetween (FIG. 3). The individual grippers 13c and 13d are then actuated at the same time. Depending on the distances the individual ceramic briquettes are to have with respect to each other, the actuation of the individual grippers is effected correspondingly. The gripper carriage 9 can move continuously in the direction of the arrow B during the separating process and alternatively the gripper carriage 9 can be stopped for a short time at the placing of the ceramic briquettes 3 onto the transport belt 1. If the separating process is terminated and all individual grippers 13 have been actuated, then the liftable bridge 8 is lifted up so far that the individual grippers do not interfere with the transporting away of the spaced apart cross row 2a. The gripper carriage 9 then immediately moves back in opposite direction to arrow B into the starting position and is there ready for a new separating process.

The width of the individual grippers 13 is adapted to the width of the smallest briquette forms, such that in this case always only one individual gripper 13 catches a briquette 3. If wider briquettes are employed, then several individual grippers 13 grip this briquette. The number of individual grippers 13 actuated depends on the number of grippers 13 employed for gripping the briquette 3.

Figure 4:
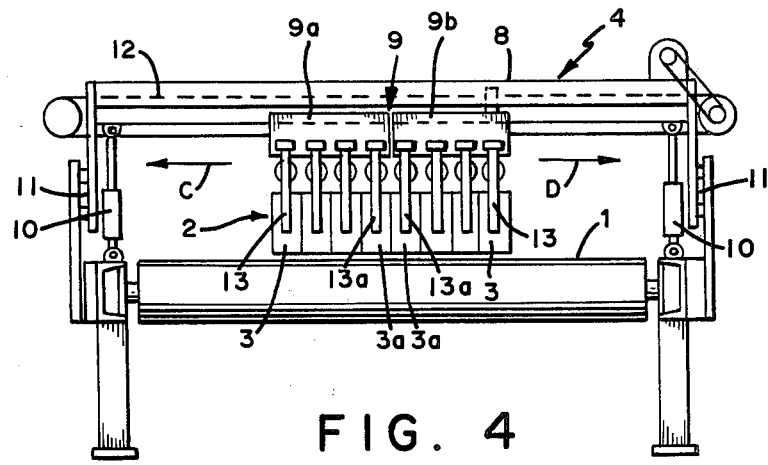
FIG. 4 is a view similar to that of FIG. 2 however employing two carriages.
Figure 5:
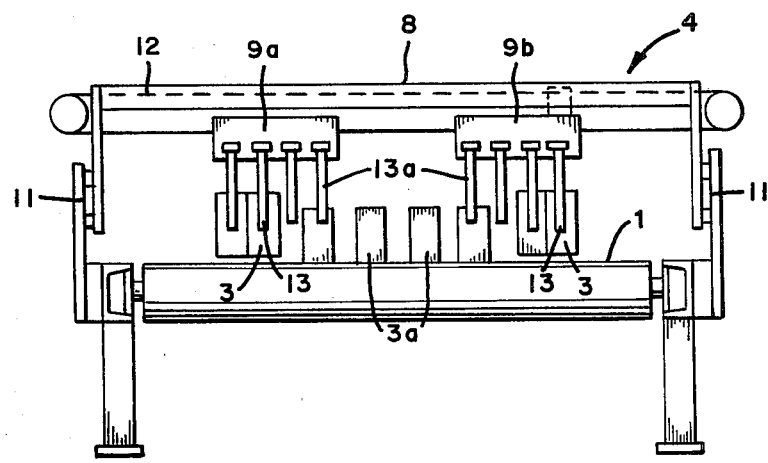
FIG. 5 is a view similar to that of FIG. 4, however in a different operating position.

The gripper carriage 9 can also be parted into two part gripper carriages 9a and 9b (FIGS. 4 and 5). The separation of the ceramic briquettes 3 of the cross row 2 is performed in the way described above by actuating the corresponding individual grippers 13 after drawing of the gap, whereby the part gripper carriage 9a with one half of the cross row 2 moves in the direction of the arrow C and the part gripper carriage 9b with the other half of the cross row 2 moves in the direction of the arrow D. After termination of the separating process the part gripper carriages 9a and 9b move back oppositely to the indicated arrows into their starting position after lifting of the liftable bridge 8.

The gripper carriage passes a distance during the separating process corresponding to the sum total of the gaps to be drawn. Each of the part gripper carriages 9a and 9b passes in the separating process a distance which corresponds to one half of the sum total of the gaps to be drawn.

It thus will be seen that there is provided an apparatus and a method which achieve the various objects of the invention and which are well adapted to practical use.

As various possible embodiments might be made of the above invention, and as various changes might be made in the embodiment above set forth, it is to be understood that all matter herein described or shown in the accompanying drawings is to be interpreted as illustrative and not in a limiting sense.

What is claimed is:

1. An apparatus for setting formed articles comprising a controllable means for transporting formed articles in a first horizontal direction;
    a bridge disposed over the controllable means for transporting, which bridge can be lifted up or lowered down;
    means for lifting and lowering said bridge;
    at least one carriage disposed on the bridge and controlled movable in a second horizontal direction having a substantial component orthogonal to said first horizontal direction;

at least two individually operable grippers attached to said carriage and disposed adjacent and forming a row in said second horizontal direction for gripping the formed articles from the controllable means for transporting;

means for moving the grippers and the gripped formed articles in said second horizontal direction; and means for releasing the formed articles successively from the grippers at desired locations.

2. The apparatus as set forth in claim 1 wherein the carriage is controlled movable in a horizontal direction substantially orthogonal to the first horizontal direction.

3. The apparatus as set forth in claim 1 wherein the grippers grip the formed articles from the front side relative to the motion direction of the controllable means for transporting.

4. The apparatus as set forth in claim 1 wherein the controllable means for transporting is a conveyor belt.

5. The apparatus as set forth in claim 1 wherein the controllable means for transporting comprises two conveyor belts separately controllable which adjoin closely spaced near the bridge.

6. The apparatus as set forth in claim 1 wherein said means for lifting and lowering said bridge comprises hydraulic jacks.

7. The apparatus as set forth in claim 1 wherein two substantially mirror symmetrical carriages are employed.

8. The apparatus as set forth in claim 1 wherein two carriages are employed which move symmetrically apart from each other and together to each other.

9. The apparatus as set forth in claim 1 wherein the formed articles are ceramic briquettes disposed in cross rows on the means for transporting.

10. A method for resetting formed articles comprising moving the formed articles horizontally in a first direction by horizontal transportation means supporting them;

interrupting the motion in the first direction while some of the formed articles are below a plurality of gripper means;

disposing the plurality of gripper means for matching the positions of the formed articles below the plurality of gripper means;

lowering the gripper means for gripping said formed articles below the plurality of gripper means;

lifting the plurality of gripper means while holding said formed articles;

moving the gripper means in a second horizontal direction having a component orthogonal to the first direction; and releasing the formed articles successively from said gripper means.

11. The method as set forth in claim 10 wherein before the release of the formed article from said gripper means the motion of said gripper means is interrupted.

12. The method as set forth in claim 11 wherein the releasing of the formed article from said gripper means is preceded by a lowering of the gripper means to reduce the gap between the formed article and the transportation means.

13. The method as set forth in claim 11 wherein some of the gripper means are moving jointly in the horizontal direction.

14. The method as set forth in claim 10 wherein at least two gripper means move in the second horizontal direction having a component orthogonal to the first direction.

15. The method as set forth in claim 10 wherein the plurality of gripper means forms at least two groups moving relative to each other substantially in opposite directions with about equal but oppositely directed speeds.

16. The method as set forth in claim 10 wherein the formed articles are disposed in cross rows to the first direction.

17. The method as set forth in claim 16 wherein the gripper means are aligned in said second horizontal direction orthogonal to the first direction.

18. The method as set forth in claim 17 wherein the plurality of gripper means grips said articles from the front side relative to the motion in said first direction.

* * * * *